United States Patent
Chen

(10) Patent No.: US 11,561,651 B2
(45) Date of Patent: Jan. 24, 2023

(54) VIRTUAL PAINTBRUSH IMPLEMENTING METHOD AND APPARATUS, AND COMPUTER READABLE STORAGE MEDIUM

(71) Applicant: Beijing Bytedance Network Technology Co., Ltd., Beijing (CN)

(72) Inventor: Yi Chen, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/510,837

(22) Filed: Oct. 26, 2021

(65) Prior Publication Data

US 2022/0107704 A1 Apr. 7, 2022

Related U.S. Application Data

(63) Continuation of application No. PCT/CN2019/129875, filed on Dec. 30, 2019.

(30) Foreign Application Priority Data

Apr. 26, 2019 (CN) .......................... 201910345745.4

(51) Int. Cl.
G06F 3/042 (2006.01)
G06F 3/01 (2006.01)
G06T 11/40 (2006.01)

(52) U.S. Cl.
CPC ............ *G06F 3/0425* (2013.01); *G06F 3/011* (2013.01); *G06F 3/017* (2013.01); *G06T 11/40* (2013.01)

(58) Field of Classification Search
None
See application file for complete search history.

(56) References Cited

U.S. PATENT DOCUMENTS

| 2013/0222385 | A1* | 8/2013 | Dorsey | ................. G06T 15/005 345/427 |
| 2014/0123079 | A1 | 5/2014 | Wu | |
| 2017/0092009 | A1 | 3/2017 | Polo et al. | |
| 2018/0075657 | A1* | 3/2018 | Lanier | ..................... G06F 3/011 |
| 2019/0371277 | A1* | 12/2019 | Zhong | ..................... G09G 5/377 |

FOREIGN PATENT DOCUMENTS

| CN | 105894554 A | 8/2016 |
| CN | 106101576 A | 11/2016 |
| CN | 106157363 A | 11/2016 |
| CN | 106331482 A | 1/2017 |
| CN | 107291266 A | 10/2017 |
| CN | 107888845 A | 4/2018 |
| CN | 108597006 A | 9/2018 |
| JP | H06-507036 A | 8/1994 |
| JP | 2015-504565 A | 2/2015 |
| WO | WO 2019/041351 A1 | 3/2019 |

* cited by examiner

*Primary Examiner* — Parul H Gupta
(74) *Attorney, Agent, or Firm* — BakerHostetler

(57) ABSTRACT

A method and an apparatus for implementing a virtual paintbrush are provided. The method includes: acquiring a real shooting scene by a camera of a terminal device; forming, based on an operation performed on the terminal device, a handwriting area of the virtual paintbrush in the real shooting scene; and forming handwriting of the virtual paintbrush based on the handwriting area, where the handwriting is fused with the real shooting scene and a fused image is displayed on the terminal device.

14 Claims, 4 Drawing Sheets

VIRTUAL PAINTBRUSH IMPLEMENTING METHOD AND APPARATUS, AND COMPUTER READABLE STORAGE MEDIUM

The present application is a continuation of International Patent Application No. PCT/CN2019/129875 filed on Dec. 30, 2019, which claims priority to Chinese Patent Application No. 201910345745.4, titled "VIRTUAL PAINTBRUSH IMPLEMENTING METHOD AND APPARATUS, AND COMPUTER READABLE STORAGE MEDIUM", filed on Apr. 26, 2019 with the Chinese Patent Office, both of which are incorporated herein by reference in their entireties.

FIELD

The present disclosure relates to the technical field of augmented reality, and in particular to a method and an apparatus for implementing a virtual paintbrush, and a computer readable storage medium.

BACKGROUND

Virtual technology is a technology for calculating a position and an angle of an image captured by a camera in a real time manner and adding an image, a video or a 3D model to the captured image. An object of the technology is to combine a virtual world with a real world and realize interaction between the virtual world and the real world.

With the development of the virtual technology, in order to meet imagination of people for virtual creation, a virtual paintbrush is provided at present. The virtual paintbrush is a hardware device. As long as a user waves the virtual paintbrush in front of a camera of a terminal device, imagination of the user is presented by an image displayed on the terminal device.

However, a conventional virtual paintbrush is a physical virtual paintbrush. The paintbrush is not only expensive, but also is required to perform painting in front of a camera. Therefore, the paintbrush is complicated to be implemented.

SUMMARY

A method for implementing a virtual paintbrush is provided according to the present disclosure to at least partially solve a technical problem that conventional video classification is not accurate. In addition, an apparatus for implementing a virtual paintbrush, a hardware apparatus for implementing a virtual paintbrush, a computer readable storage medium and a terminal for implementing a virtual paintbrush are provided according to the present disclosure.

In order to solve the above problems, according to an aspect of the present disclosure, the following technical solutions are provided.

A method for implementing a virtual paintbrush is provided. The method includes: acquiring a real shooting scene by a camera of a terminal device; forming, based on an operation performed on the terminal device, a handwriting area of the virtual paintbrush in the real shooting scene; and forming handwriting of the virtual paintbrush based on the handwriting area. The handwriting is fused with the real shooting scene and a fused image is displayed on the terminal device.

The forming, based on an operation performed on the terminal device, a handwriting area of the virtual paintbrush in the real shooting scene includes: determining, based on the operation performed on the terminal device, at least one point formed by the virtual paintbrush in the real shooting scene, and forming the handwriting area of the virtual paintbrush based on the at least one point.

The forming the handwriting area of the virtual paintbrush based on the at least one point includes: connecting, in a case that multiple points are formed, the multiple points in the real shooting scene according to a predetermined rule to form a line, and forming the handwriting area of the virtual paintbrush based on the line.

The determining, based on the operation performed on the terminal device, at least one point formed by the virtual paintbrush in the real shooting scene includes: establishing a three-dimensional coordinate system of the real shooting scene and determining an origin of the three-dimensional coordinate; and selecting a reference axis from three axes of the three-dimensional coordinate system, and determining, along the reference axis, the at least one point formed in the real shooting scene based on the operation performed on the terminal device.

The connecting, in a case that multiple points are formed, the multiple points in the real shooting scene according to a predetermined rule to form a line includes: connecting sequentially, in a case that multiple points are formed, the multiple points along a positive direction or a negative direction of the reference axis in the three-dimensional coordinate system of the real shooting scene to form a line.

The forming the handwriting area of the virtual paintbrush based on the line includes: obtaining a first segment based on the line, where the first segment includes at least one sub-segment and endpoints of the sub-segment are points among the multiple points; making, for each of the sub-segments, a vertical segment crossing an endpoint of the sub-segment, to obtain multiple vertical segments; classifying endpoints of the multiple vertical segments into two categories based on positions of the endpoints and connecting, for each category of endpoints, endpoints belonging to the category, to form a second segment and a third segment; and forming the handwriting area of the virtual paintbrush by a sub-segment corresponding to a first point, a sub-segment corresponding to a last point, the second segment and the third segment.

The forming handwriting of the virtual paintbrush based on the handwriting area includes: forming extension areas with a predetermined shape respectively at two ends of the handwriting area, where the extension areas serve as a start point and an end point of the virtual paintbrush respectively; and forming the handwriting of the virtual paintbrush by the handwriting area and the extension areas.

The forming handwriting of the virtual paintbrush based on the handwriting area includes: filling the handwriting area with a color or a material to form the handwriting of the virtual paintbrush.

The method further includes: detecting a moving direction and a tilt angle of the terminal device; determining a direction of a plane formed by the handwriting of the virtual paintbrush based on the moving direction and the tilt angle; and controlling the plane formed by the handwriting of the virtual paintbrush to face a screen in the determined direction.

The method further includes: detecting a movement of the terminal device, where the movement serves as the operation performed on the terminal device; or detecting a gesture performed on the screen of the terminal device, where the gesture serves as the operation performed on the terminal device.

An apparatus for implementing a virtual paintbrush is provided. The apparatus includes a real scene acquisition module, a handwriting area formation module, a handwriting formation module and a fusion module.

The real scene acquisition module is configured to acquire a real shooting scene by a camera of a terminal device.

The handwriting area formation module is configured to form a handwriting area of a virtual paintbrush in the real shooting scene based on an operation performed on the terminal device.

The handwriting formation module is configured to form handwriting of the virtual paintbrush based on the handwriting area.

The fusion module is configured to fuse the handwriting with the real shooting scene, where a fused image is displayed on the terminal device.

The handwriting area formation module includes a point formation unit and a handwriting area formation unit.

The point formation unit is configured to determine, based on the operation performed on the terminal device, at least one point formed by the virtual paintbrush in the real shooting scene.

The handwriting area formation unit is configured to form the handwriting area of the virtual paintbrush based on the at least one point.

The handwriting area formation unit is configured to connect, in a case that multiple points are formed, the multiple points in the real shooting scene according to a predetermined rule to form a line, and form the handwriting area of the virtual paintbrush based on the line.

The point formation unit is configured to establish a three-dimensional coordinate system of the real shooting scene, determine an origin of the three-dimensional coordinate, select a reference axis from three axes of the three-dimensional coordinate system and determine, based on the operation performed on the terminal device and along the reference axis, the at least one point formed in the real shooting scene.

The handwriting area formation unit is configured to connect sequentially, in a case that multiple points are formed, the multiple points along a positive direction or a negative direction of the reference axis in the three-dimensional coordinate system of the real shooting scene to form a line.

The handwriting area formation unit is configured to form a first segment based on the line, where the first segment includes at least one sub-segment and endpoints of the sub-segment are points among the multiple points; make, for each of the sub-segments, a vertical segment crossing an endpoint of the sub-segment to obtain multiple vertical segments; classify endpoints of the multiple vertical segments into two categories based on positions of the endpoints, and connect, for each category of endpoints, endpoints belonging to the category to form a second segment and a third segment; and form the handwriting area of the virtual paintbrush based on a sub-segment corresponding to a first point, a sub-segment corresponding to a last point, the second segment and the third segment.

The handwriting formation module is configured to form extension areas with a predetermined shape respectively at two ends of the handwriting area. The extension areas serve as a start point and an end point of the virtual paintbrush respectively. The handwriting area and the extension areas form the handwriting of the virtual paintbrush.

The handwriting formation module is configured to fill the handwriting area with a color or a material to form the handwriting of the virtual paintbrush.

The apparatus further includes a module for determining a plane formed by handwriting.

The module for determining a plane formed by handwriting is configured to detect a moving direction and a tilt angle of the terminal device; determine a direction of a plane formed by the handwriting of the virtual paintbrush based on the moving direction and the tilt angle; and control, in the determined direction, the plane formed by the handwriting of the virtual paintbrush to face a screen.

The handwriting area formation module is further configured to: detect a movement of the terminal device, where the movement serves as the operation performed on the terminal device; or detect a gesture performed on the screen of the terminal device, where the gesture serves as the operation performed on the terminal device.

In order to realize the above objective, the following technical solutions are further provided according to another aspect of the present disclosure.

An electronic device is provided. The electronic device includes a memory and a processor.

The memory is configured to store non-transitory computer readable instructions.

The processor is configured to execute the computer readable instructions to perform the above method for implementing a virtual paintbrush.

In order to realize the above objective, the following technical solutions are further provided according to another aspect of the present disclosure.

A computer readable storage medium is provided. The computer readable storage medium stores non-transitory computer readable instructions. The instructions, when being executed by a computer, cause the computer to perform the above method for implementing a virtual paintbrush.

In order to realize the above objective, the following technical solutions are further provided according to another aspect of the present disclosure.

A terminal for implementing a virtual paintbrush is provided. The terminal includes the above apparatus for implementing a virtual paintbrush.

In the embodiment of the present disclosure, a real shooting scene is acquired by a camera of a terminal device. A handwriting area of a virtual paintbrush is formed in the real shooting scene based on an operation performed on the terminal device and handwriting of the virtual paintbrush is formed based on the handwriting area. The handwriting is fused with the real shooting scene. A fused image is displayed on the terminal device. A painting function of a virtual paintbrush can be realized without a hardware virtual paintbrush. In addition, the virtual paintbrush according to the present disclosure performs painting in the real shooting scene acquired by the camera, thereby reducing complexity of calculation in a painting process and thus simplifying implementation of painting performed by the virtual paintbrush.

The above description is merely an overview of technical solutions in the present disclosure. In order to make technique means of the present disclosure more clear so as to be implemented according to the present disclosure, and make the above and other purposes, features and advantages better understood, preferred embodiments are described in detail below in conjunction with drawings.

BRIEF DESCRIPTION OF THE DRAWINGS

In order to clearly describe the technical solutions in the embodiments of the present disclosure or technical solutions in the conventional technologies, drawings to be used in the description of the embodiments of the present disclosure or the conventional technologies are briefly described hereinafter. It is apparent that the drawings described below merely show some embodiments of the present disclosure, and those skilled in the art may obtain other drawings according to the provided drawings without any creative effort.

DETAILED DESCRIPTION OF EMBODIMENTS

The embodiments of the present disclosure are described with examples hereinafter, and those skilled in the art may easily learn about other advantages and effects of the present disclosure from details disclosed in the present disclosure. Apparently, embodiments described below are merely some, rather than all of embodiments of the present disclosure. The present disclosure may be implemented or applied in other different embodiments. Based on different views and applications, details in the present disclosure may be modified or changed without departing from the spirit of the present disclosure. It should be noted that, embodiments below and features in the embodiments may be in combination with each other without a conflict. Based on the embodiments of the present disclosure, all other embodiments obtained by those skilled in the art without creative efforts fall within the protection scope of the present disclosure.

It should be noted that various aspects of embodiments in the scope of the attached claims are described below. Apparently, the various aspects described herein may be implemented in various forms, and any specific structures and/or functions described herein are only illustrative. According to the present disclosure, those skilled in the art should know that any aspects described herein may be implemented independently from other aspects or may be implemented in combination with one or more other aspects in various ways. For example, a device and/or method may be implemented according to any aspects of the present disclosure. In addition, other structures and/or functions than one or more aspects of the present disclosure may be used to implement the device and/or method.

It should be noted that, the drawings provided in the following embodiments are merely used to schematically explain a basic concept of the present disclosure. The drawings only show elements relating to the present disclosure and are not drawn according to real number, shape and size of the elements in practical implementations. The shape, number and scale of each element in practical implementations may be changed arbitrarily and the configuration of the elements may be more complex.

Moreover, in the following description, details are provided for better understanding of the embodiments. However, those skilled in the art should know that the aspects of the present disclosure may be implemented without the details.

Figure 1A:
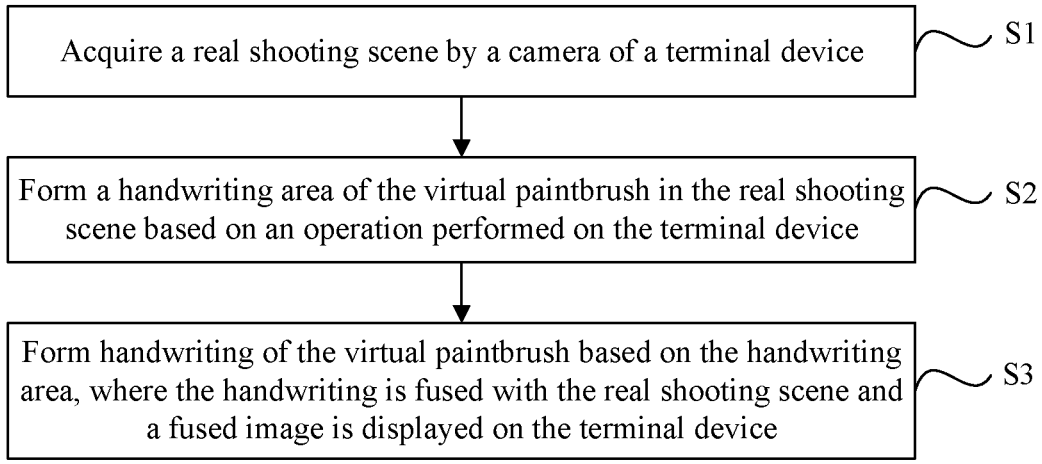
FIG. 1a is a flowchart of a method for implementing a virtual paintbrush according to an embodiment of the present disclosure.

In order to solve the technical problem that implementation of a virtual paintbrush is complex in the conventional technologies, a method for implementing a virtual paintbrush is provided according to an embodiment of the present disclosure. As shown in FIG. 1a, the method for implementing a virtual paintbrush mainly includes the following steps S1 to S4.

In step S1, a real shooting scene is acquired by a camera of a terminal device.

The terminal device may be a mobile terminal (for example, an intelligent mobile phone, an iPhone, an intelligent camera, a tablet computer and the like), a laptop computer or a fixed terminal device (for example, a desktop computer).

For example, the camera of the terminal device may be turned on through application software (such as short video software) that supports a virtual paintbrush. When a virtual paintbrush function of the application software is to be used, a user may turn on the camera of the terminal device by clicking on a camera-turning on button on a display interface of the application software to enter a shooting interface. The real shooting scene is displayed on the shooting interface. In addition, a virtual paintbrush option may be configured on the shooting interface of the application software, so that the user may utilize the virtual paintbrush function. After the user utilizes the virtual paintbrush function, the method for implementing a virtual paintbrush according to the present disclosure can be performed.

In step S2, a handwriting area of a virtual paintbrush is formed in the real shooting scene based on an operation performed on the terminal device.

The operation may be set by the user, such as a movement of the terminal device or a gesture performed on a screen of the terminal device.

The handwriting area may be an enclosed area with a fixed shape. For example, the fixed shape may be a rectangle, a polygon, a triangle, a circle, a human shape, or an animal shape.

In step S3, handwriting of the virtual paintbrush is formed based on the handwriting area. The handwriting is fused with the real shooting scene and a fused image is displayed on the terminal device.

For example, the handwriting area may be filled with a color or a material to form the handwriting of the virtual paintbrush, thereby completing virtual painting.

For example, assuming that the real shooting scene acquired by the camera includes a table, the user may perform an operation on the terminal device to form handwriting of the virtual paintbrush. The handwriting may be a pattern of an apple. Then the apple is placed on the table in the real shooting scene by fusing the pattern of the apple with the real shooting scene. Then a fused image is displayed on the screen of the terminal device. In this way, an effect that an apple is placed on the table in the real shooting scene is realized.

In the embodiment, a real shooting scene is acquired by a camera of a terminal device. A handwriting area of a virtual paintbrush is formed in the real shooting scene based on an operation performed on the terminal device and handwriting of the virtual paintbrush is formed based on the handwriting area. The handwriting is fused with the real shooting scene. A fused image is displayed on the terminal device. In this way, a painting function of a virtual paintbrush can be realized without a hardware virtual paintbrush. In addition, the virtual paintbrush according to the present disclosure performs painting in the real shooting scene acquired by the camera, thereby reducing complexity of calculation in a painting process and thus simplifying implementation of painting performed by the virtual paintbrush.

Figure 1B:
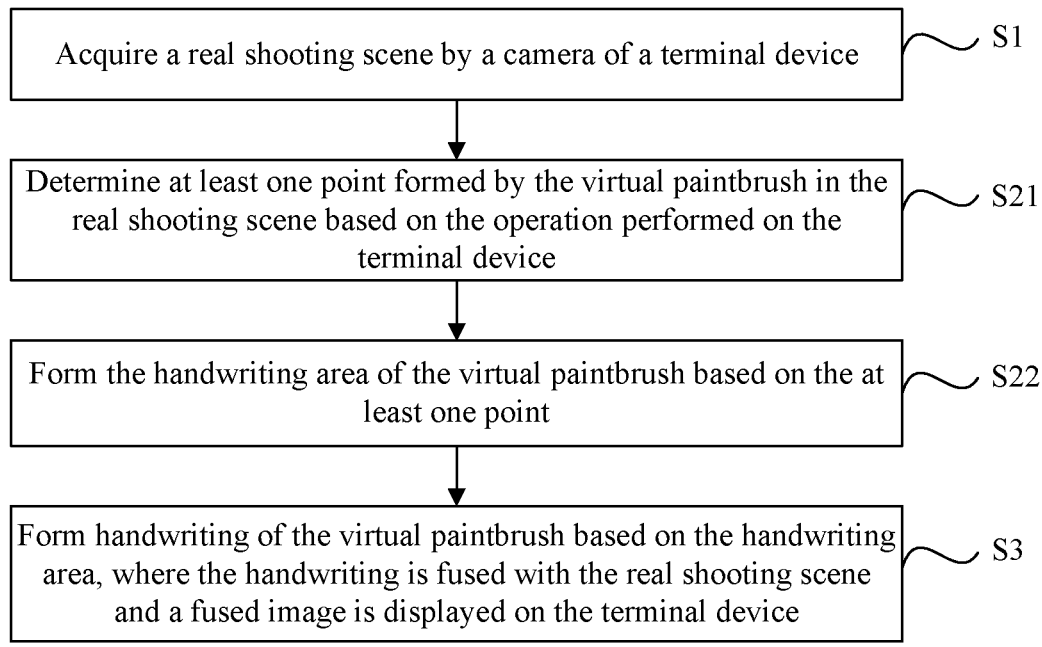
FIG. 1b is a flowchart of a method for implementing a virtual paintbrush according to another embodiment of the present disclosure.

In an embodiment, as shown in FIG. 1b, step S2 includes the following steps S21 and S22.

In step S21, at least one point formed by the virtual paintbrush in the real shooting scene is determined based on an operation performed on the terminal device.

For example, a movement of the terminal device may be detected, and a position of the terminal device in the real shooting scene may be determined based on the movement of the terminal device (a Simultaneous Localization And Mapping (SLAM) algorithm in the conventional technologies may be used). The position serves as a point. Each time the terminal device moves to a position, a point is formed. After the terminal device moves multiple numbers of times and reaches multiple positions, multiple points are formed. A position of the terminal device in the real shooting scene acquired when the application software for implementing the virtual paintbrush function is open may serve as a start point of the virtual paintbrush or an origin of a three-dimensional coordinate of the real shooting scene.

Alternatively, at least one point may be formed based on a gesture performed by the user on the screen of the terminal device. For example, one point may be formed through one single click or one double click on the screen of the terminal device. Multiple points may be formed through multiple single clicks or multiple double clicks on the screen of the terminal device. Alternatively, a sliding operation performed by the user on the screen of the terminal device is detected and multiple points are formed based on a track of the sliding.

In step S22, the handwriting area of the virtual paintbrush is formed based on the at least one point.

For example, in a case that one point is formed, extension may be performed around the point to form an area with a fixed shape. The area with a fixed shape is the handwriting area of the virtual paintbrush. For example, the fixed shape may be a rectangle, a polygon, a triangle, a circle, a human shape, or an animal shape. In a case that multiple points are formed, the handwriting area of the virtual paintbrush may be formed based on the multiple points. Then, the handwriting of the virtual paintbrush may be formed based on the handwriting area.

In an embodiment, step S22 includes the following steps S221 and S222.

In step S221, in a case that multiple points are formed, the multiple points are connected according to a predetermined rule in the real shooting scene to form a line.

The line may be a straight line or a curve.

The predetermined rule may be a chronological order in which the multiple points are formed, or an order in which the multiple points are arranged in a space.

In step S222, the handwriting area of the virtual paintbrush is formed based on the line.

By connecting the multiple points in the chronological order in which the multiple points are formed, a fixed shape such as a triangle, a circle, a polygon, a sphere, a cube, a human shape, and an animal shape may be formed. An area corresponding to the fixed shape serves as the handwriting area of the virtual paintbrush. By connecting the multiple points in the order in which the multiple points are arranged in the space, multiple segments may be formed and the handwriting area of the virtual paintbrush is formed based on the multiple segments.

In an embodiment, step S21 includes:

establishing a three-dimensional coordinate system of the real shooting scene and determining an origin of the three-dimensional coordinate; and selecting a reference axis from three axes of the three-dimensional coordinate system, and determining, along the reference axis, at least one point formed in the real shooting scene based on the operation performed on the terminal device.

Any one of X axis, Y axis, and Z axis may be selected to serve as the reference axis.

The at least one point formed in the real shooting scene may be sequentially determined along a positive direction or a negative direction of the reference axis.

Step S221 includes: connecting, in a case that multiple points are formed, the multiple points sequentially along the positive direction or the negative direction of the reference axis in the three-dimensional coordinate system of the real shooting scene, to form a line.

In an embodiment, step S222 includes the following steps S2221 to S2224.

In step S2221, a first segment is formed based on the line. The first segment includes at least one sub-segment and endpoints of the sub-segment are points among the multiple points.

In the present disclosure, in order to distinguish a segment from another, a segment mentioned first is referred to as a first segment and segments subsequently mentioned are referred to as a second segment and a third segment respectively.

In step S2222, for each of the sub-segments, a vertical segment crossing an endpoint of the sub-segment is made, such that multiple vertical segments are obtained.

In step S2223, endpoints of the multiple vertical segments are classified into two categories based on positions of the endpoints. For each category of endpoints, endpoints belonging to the category are connected to form a segment, such that a second segment and a third segment are formed.

Based on the positions of the endpoints of the vertical segments, endpoints located at the same side of the first segment may be classified into the same category. For example, if the endpoints of the vertical segments are distributed at an upper side and a lower side of the first segment, endpoints distributed at the upper side are classified into one category and endpoints distributed at the lower side are classified into another category. The endpoints distributed at the upper side are connected to form a second segment and the endpoints distributed at the lower side are connected to form a third segment.

In step S2224, a sub-segment corresponding to a first point, a sub-segment corresponding to a last point, the second segment and the third segment form the handwriting area of the virtual paintbrush.

Figure 1C:
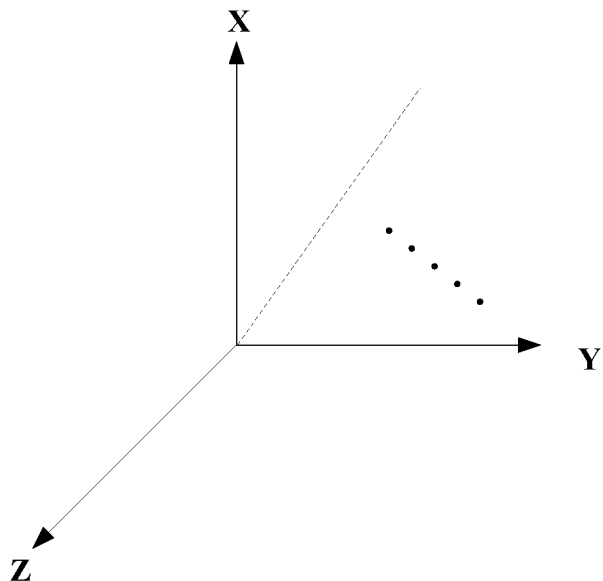
FIG. 1c is a schematic diagram of points formed by a virtual paintbrush with the method for implementing a virtual paintbrush according to an embodiment of the present disclosure.
Figure 1D:
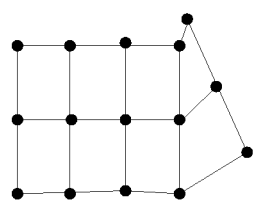
FIG. 1d is a schematic diagram of a handwriting area of a virtual paintbrush formed with the method for implementing a virtual paintbrush according to an embodiment of the present disclosure.

The embodiment is described in detail below by taking a case in which a movement of the terminal device serves as a triggering condition as an example. A current position of the terminal device in the real shooting scene may be identified through the SLAM algorithm. The current position may be represented by a coordinate (0, 0, 0). Each time the terminal device moves to a position, a point of the virtual paintbrush may be determined in the negative direction of the Z axis (here the Z axis serves as a reference axis). As shown in FIG. 1c, multiple points are connected according to an order in which the multiple points are arranged in the space to form a segment including multiple sub-segments. For each point on the multiple sub-segments, a vertical segment crossing the point is made for a sub-segment in front of the point and two endpoints are formed at two sides of the vertical segment. Endpoints distributed at an upper side of the segment are connected to form a line and endpoints distributed at a lower side of the segment are connected to form a line, thereby obtaining a handwriting area of the virtual paintbrush, as shown in FIG. 1d.

In an embodiment, step S3 includes the following steps S31 and S32.

In step S31, extension areas with a predetermined shape are formed respectively at two ends of the handwriting area and the extension areas serve as a start point and an end point of the virtual paintbrush respectively.

Figure 1E:
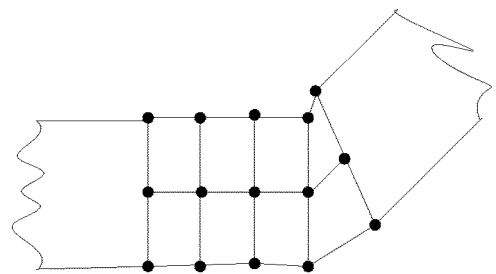
FIG. 1e is a schematic diagram of extended areas of the handwriting area of the virtual paintbrush formed with the method for implementing a virtual paintbrush according to an embodiment of the present disclosure.

In order to have fixed shapes at both ends of the handwriting, the predetermined shape may be, for example, a zigzag or a burr and extension areas are required to be formed at the two ends of the handwriting area. As shown in FIG. 1e, zigzag rectangles may be formed through extension respectively at a front end and a back end of the handwriting area shown in FIG. 1d to serve as the start point and the end point of the virtual paintbrush.

In step S32, the handwriting area and the extension areas form the handwriting of the virtual paintbrush.

In an embodiment, the method according to the present disclosure further includes the following steps S4 to S6.

In step S4, a moving direction and a tilt angle of the terminal device are detected.

In step S5, a direction of a plane formed by the handwriting of the virtual paintbrush is determined based on the moving direction and the tilt angle.

In step S6, the plane formed by the handwriting of the virtual paintbrush is controlled to face the screen in the determined direction.

Based on a viewing angle, there may be two cases for the handwriting of the virtual paintbrush finally formed. In a case, the formed handwriting is fixed and a thickness of the handwriting viewed from the screen of the terminal device may change with a change of the viewing angle. In another case, each time the viewing angle changes, an angle of each frame of the image shoot by the camera of the terminal device is calculated, to control the handwriting of the virtual paintbrush to always face the screen. In this way, no matter how the angle of the terminal device changes, the thickness of the handwriting does not change.

For example, a vector $\vec{c}$ may be calculated according to an equation $\vec{c} = \vec{v} \times \vec{l}$. In the equation, $\vec{l}$ represents the viewing angle, $\vec{v}$ represents a displacement of the terminal device, and $\vec{l}$ and $\vec{v}$ may be obtained by using the SLAM algorithm. The vector $\vec{c}$ perpendicular to both $\vec{l}$ and $\vec{v}$ may be obtained by a product of vectors. The vector $\vec{c}$ serves as the direction of the plane formed by the handwriting and the plane formed by the handwriting is controlled to face the screen.

Those skilled in the art should understand that obvious variants (for example, a combination of the enumerated modes) or equivalent substitutions may be made based on the above embodiments.

Although various steps in the embodiments of the method for implementing a virtual paintbrush are described in the above order hereinbefore, those skilled in the art should understand that steps in the embodiments of the present disclosure are not necessary to be performed in the described order and may be performed in a reverse order, a parallel order, a crossover order or other orders. In addition, based on the above steps, those skilled in the art may also add other steps. These distinct variations or equivalent substitutions also fall within the protection scope of the present disclosure, which is not described herein.

Apparatus embodiments of the present disclosure are described below. The apparatus of the present disclosure may be applied to implement steps in the method embodiments of the present disclosure. Only parts relevant to the embodiments of the present disclosure are described in the apparatus embodiments for illustration. For technical details not disclosed, one may refer to the method embodiments of the present disclosure.

Figure 2:
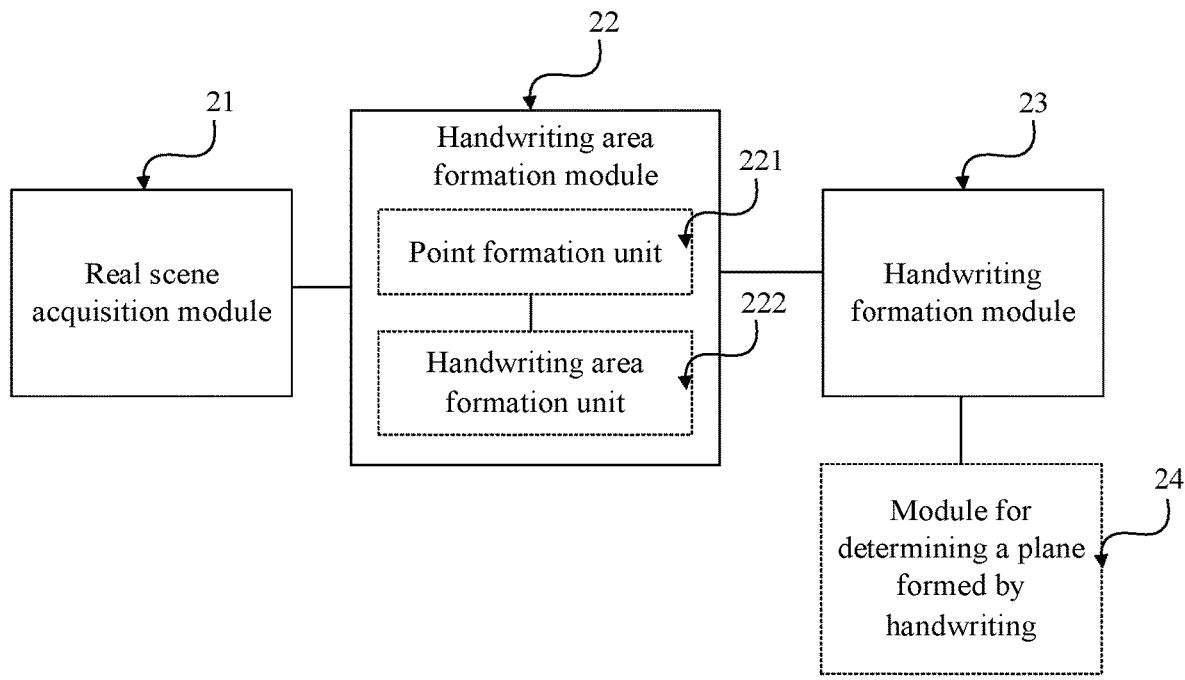
FIG. 2 is a schematic structural diagram of an apparatus for implementing a virtual paintbrush according to an embodiment of the present disclosure.

In order to improve implementation efficiency and real-time performance of a virtual paintbrush, an apparatus for implementing a virtual paintbrush is provided according to an embodiment of the present disclosure. The apparatus may perform steps in the embodiments of the method for implementing a virtual paintbrush. As shown in FIG. 2, the apparatus includes a real scene acquisition module 21, a handwriting area formation module 22, and a handwriting formation module 23.

The real scene acquisition module 21 is configured to acquire a real shooting scene by a camera of a terminal device.

The handwriting area formation module 22 is configured to form a handwriting area of a virtual paintbrush in the real shooting scene based on an operation performed on the terminal device.

The handwriting formation module 23 is configured to form handwriting of the virtual paintbrush based on the handwriting area. The handwriting is fused with the real shooting scene, and a fused image is displayed on the terminal device.

The handwriting area formation module 22 includes a point formation unit 221 and a handwriting area formation unit 222.

The point formation unit 221 is configured to determine, based on the operation performed on the terminal device, at least one point formed by the virtual paintbrush in the real shooting scene.

The handwriting area formation unit 222 is configured to form the handwriting area of the virtual paintbrush based on the at least one point.

The handwriting area formation unit 222 is configured to connect, in a case that multiple points are formed, the multiple points in the real shooting scene according to a predetermined rule to form a line, and form the handwriting area of the virtual paintbrush based on the line.

The point formation unit 221 is configured to establish a three-dimensional coordinate system of the real shooting scene, determine an origin of the three-dimensional coordinate; select a reference axis from three axes of the three-dimensional coordinate system and determine, based on the operation performed on the terminal device and along the reference axis, the at least one point formed in the real shooting scene.

The handwriting area formation unit 222 is configured to connect sequentially, in a case that multiple points are formed, the multiple points along a positive direction or a negative direction of the reference axis in the three-dimensional coordinate system of the real shooting scene to form a line.

The handwriting area formation unit 222 is configured to form a first segment based on the line, where the first segment includes at least one sub-segment and endpoints of the sub-segment are points among the multiple points; make, for each of the sub-segments, a vertical segment crossing an endpoint of the sub-segment to obtain multiple vertical segments; classify endpoints of the multiple vertical segments into two categories based on positions of the endpoints; connect, for each category of endpoints, endpoints belonging to the category to form a second segment and a third segment; and form the handwriting area of the virtual paintbrush based on the sub-segment corresponding to the first point, the sub-segment corresponding to the last point, the second segment and the third segment.

The handwriting formation module 23 is configured to form extension areas with a predetermined shape at two ends of the handwriting area. The extension areas serve as a start point and an end point of the virtual paintbrush respectively. The handwriting area and the extension areas form the handwriting of the virtual paintbrush.

The handwriting formation module 23 is configured to fill the handwriting area with a color or a material to form the handwriting of the virtual paintbrush.

The apparatus further includes a module 24 for determining a plane formed by handwriting.

The module 24 for determining a plane formed by handwriting is configured to detect a moving direction and a tilt angle of the terminal device; determine a direction of a plane formed by the handwriting of the virtual paintbrush based on the moving direction and the tilt angle; and control, in the determined direction, the plane formed by the handwriting of the virtual paintbrush to face the screen.

The handwriting area formation module 22 is further configured to: detect a movement of the terminal device, where the movement serves as the operation performed on the terminal device; or detect a gesture performed on the screen of the terminal device, where the gesture serves as the operation performed on the terminal device.

For detailed descriptions about the operation principle and the technical effect of the apparatus for implementing a virtual paintbrush, one may refer to relevant descriptions in the above embodiments of the method for implementing a virtual paintbrush, and the detailed descriptions are not repeated herein.

Figure 3:
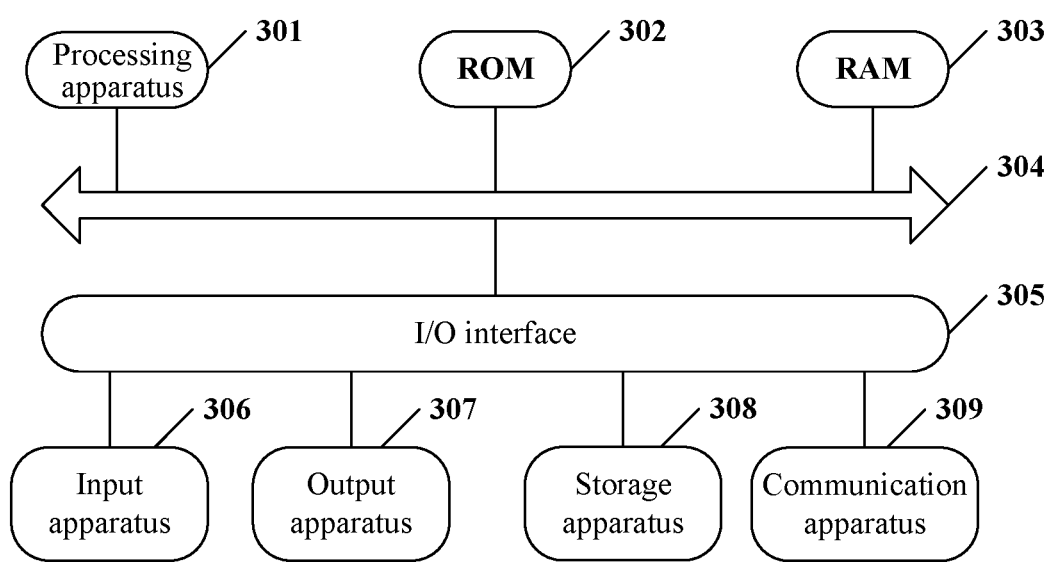
FIG. 3 is a schematic structural diagram of an electronic device according to an embodiment of the present disclosure.

FIG. 3 is a schematic structural diagram of an electronic device for implementing the embodiments of the present disclosure. The electronic device according to the embodiment of the present disclosure may include but is not limited to a mobile terminal such as a mobile phone, a laptop computer, a digital broadcast receiver, a PDA (personal digital assistant), a PAD (tablet computer), a PMP (portable multimedia player) and a vehicle terminal (for example, a vehicle navigation terminal), and a fixed terminal such as a digital TV and a desktop computer. The electronic device shown in FIG. 3 is only exemplary and is not intended to impose any limitations on the functions and the scope of use of the embodiments of the present disclosure.

As shown in FIG. 3, the electronic device may include a processing apparatus (for example, a central processing unit and a graphics processing unit) 301. The processing apparatus 301 may perform various proper actions and processing based on a grogram stored in a read-only memory (ROM) 302 or a program loaded from a storage device 308 to a random-access memory (RAM) 303. The RAM 303 further stores various programs and data for an operation of the electronic device. The processing apparatus 301, the ROM 302 and the RAM 303 are connected to each other through a bus 304. An input/output (I/O) interface 305 is also connected to the bus 304.

Generally, the following apparatus may be connected to the I/O interface 305: an input apparatus 306 such as a touch screen, a touch pad, a keyboard, a mouse, an image sensor, a microphone, an accelerometer, a gyroscope; an output apparatus 307 such as a liquid crystal display (LCD), a speaker, a vibrator; a storage apparatus 308 such as a magnetic tape, a hard disk; and a communication apparatus 309. With the communication apparatus 309, the electronic device may communicate with other devices through wired or wireless communication to exchange data. Although FIG. 3 shows the electronic device including various apparatus, it should be understood that not all shown apparatus are required to be implemented or included. The shown apparatus may be replaced with other apparatus, or more or less apparatus may be included.

According to the embodiments of the present disclosure, the process described above in conjunction with the flowchart may be implemented as a computer software program. For example, a computer program product is provided according to the embodiments of the present disclosure. The computer program product includes a computer program stored in a computer readable medium. The computer program includes program codes for performing the method shown in the flowchart. In such embodiments, the computer program may be downloaded and installed from the network through the communication apparatus 309, installed from the storage apparatus 308, or installed from the ROM 302. The computer program, when being executed by the processing apparatus 301, performs functions defined in the method according to the embodiments of the present disclosure.

It should be noted that the computer readable medium according to the present disclosure may be a computer readable signal medium, a computer readable storage medium or any combination thereof. For example, the computer readable storage medium may be, but is not limited to, an electronic, magnetic, optical, electromagnetic, infrared, or semiconductor system, apparatus, or device, or any combination thereof. In addition, the computer readable storage medium may also include but is not limited to: an electrical connection including at least one wire, a portable computer disk, a hard disk, a random access memory (RAM), a read only memory (ROM), an erasable programmable read-only memory (EPROM or a flash memory), an optical fiber, a portable compact disc read-only memory (CD-ROM), an optical storage device, a magnetic storage device, or any suitable combination thereof. In the present disclosure, the computer readable storage medium may be any tangible medium including or storing a program. The program may be used by an instruction execution system, an instruction execution apparatus or an instruction execution device or may be used in combination with the instruction execution system, the instruction execution apparatus and the instruction execution device. In the present disclosure, the computer readable signal medium may include a data signal transmitted in a baseband or transmitted as a part of a carrier. The data signal carries computer readable program codes. The transmitted data signal may has a variety of forms including, but not limited to, an electromagnetic signal, an optical signal, or any suitable combination thereof. The computer readable signal medium may also be any other computer readable medium except for the computer readable storage medium. The computer readable medium can send, transmit or transfer a program used by an instruction execution system, an instruction execution apparatus and an instruction execution device or used in combination with the instruction execution system, the instruction execution apparatus and the instruction execution device. The program codes included in the computer readable medium may be transferred through any proper medium including, but not limited to, an electric wire, an optical cable, RF (radio frequency) or any proper combination thereof.

The computer readable medium may be included in the electronic device. Alternatively, the computer readable medium may exist independently and is not included in the electronic device.

The computer readable medium may carry one or more programs. The electronic device, when executing the one or more programs, acquires a real shooting scene by a camera of a terminal device, forms a handwriting area of a virtual paintbrush in the real shooting scene based on an operation performed on the terminal device, and forms handwriting of the virtual paintbrush based on the handwriting area. The handwriting is fused with the real shooting scene and a fused image is displayed on the terminal device.

Alternatively, the computer readable medium may carry one or more programs. The electronic device, when executing the one or more programs, acquires a real shooting scene by a camera of a terminal device, forms a handwriting area of a virtual paintbrush in the real shooting scene based on an operation performed on the terminal device, and forms handwriting of the virtual paintbrush based on the handwriting area. The handwriting is fused with the real shooting scene and a fused image is displayed on the terminal device.

The computer program codes for performing the operations according to the present disclosure may be written in at least one programming language or a combination thereof. The programming language includes an object oriented programming language such as Java, Smalltalk, C++ and a conventional procedural programming language such as "C" programming language or a programming language similar to "C" programming language. The program codes may be completely executed on a user computer, partially executed on the user computer, executed as a standalone software package, partially executed on the user computer and partially executed on a remote computer, completely executed on the remote computer or a server. In the cases relating to the remote computer, the remote computer may be connected to the user computer via any category of networks including Local Area Network (LAN) or Wide Area Network (WAN), or the remote computer may be connected to an external computer (for example, via Internet provided by an Internet service provider).

The flowcharts and block diagrams in the drawings show architectures, functions and operations that may be realized with the systems, methods and computer program products according to the embodiments of the present disclosure. Each block in the flowcharts or block diagrams may represent a module, a program segment or a part of codes. The module, the program segment or the part of codes includes one or more executable instructions for implementing a specified logical function. It should be noted that in some alternative implementations, a function indicated in the block may be implemented in an order different from that indicated in the drawings. For example, steps respectively indicated in two adjacent blocks may be implemented in parallel. Sometimes the steps may be implemented in a reverse order, which depends on a function related to the steps. It should also be noted that each block in the block diagrams and/or flowcharts and a combination of blocks in the block diagrams and/or flowcharts may be implemented by a dedicated hardware-based system for performing a specified function or operation or implemented by a combination of a dedicated hardware and a computer instruction.

Units described in the embodiments of the present disclosure may be implemented through software or hardware. Names of the units do not limit the units in some cases. For example, the first acquisition unit may also be described as "a unit for acquiring at least two Internet protocol addresses".

Only preferred embodiments of the present disclosure and the technical principles of the present disclosure are described above. Those skilled in the art should understand that the scope of the present disclosure is not limited to a technical solution formed by combining the above technical features in a specific manner and should cover other technical solutions formed by combining the above technical features or equivalent features of the above technical features in an arbitrary manner without departing from the conception of the present disclosure. For example, the scope of the present disclosure covers a technical solution formed by replacing the above feature with a technical feature having a similar function disclosed in (but not limited to) the present disclosure.

The invention claimed is:

1. A method for implementing a virtual paintbrush, comprising:
    acquiring a real shooting scene by a camera of a terminal device;
    forming, based on an operation performed on the terminal device, a handwriting area of the virtual paintbrush in the real shooting scene;
    forming handwriting of the virtual paintbrush based on the handwriting area, wherein the handwriting is fused with the real shooting scene and a fused image is displayed on the terminal device;
    wherein the method further comprises:
    detecting a moving direction and a tilt angle of the terminal device;
    determining a direction of a plane formed by the handwriting of the virtual paintbrush based on the moving direction and the tilt angle;
    controlling the plane formed by the handwriting of the virtual paintbrush to face a screen in the determined direction;
    wherein the method further comprises:
    detecting an initial position of the terminal device in the real shooting scene;
    establishing a three-dimensional coordinate system of the real shooting scene based on the initial position of the terminal device, wherein the initial position of the terminal device is an origin of the three-dimensional coordinate;
    detecting a plurality of positions of the terminal device when the terminal device moves;
    determining a plurality of points of the virtual paintbrush based on the plurality of positions of the terminal device;
    creating the handwriting area based on the plurality of points of the virtual paintbrush and predetermined rules;

adding extension areas at two ends of the handwriting area, wherein each of the extension areas has a predetermined shape, and wherein the extension areas serve as a start point and an end point of the virtual paintbrush, respectively; and creating the handwriting of the virtual paintbrush based on the handwriting area and the extension areas.

2. The method according to claim 1, wherein the forming, based on an operation performed on the terminal device, a handwriting area of the virtual paintbrush in the real shooting scene comprises:

determining, based on the operation performed on the terminal device, at least one point formed by the virtual paintbrush in the real shooting scene; and forming the handwriting area of the virtual paintbrush based on the at least one point.

3. The method according to claim 2, wherein the forming the handwriting area of the virtual paintbrush based on the at least one point comprises:

connecting, in a case that a plurality of points are formed, the plurality of points in the real shooting scene according to a predetermined rule to form a line; and forming the handwriting area of the virtual paintbrush based on the line.

4. The method according to claim 3, wherein the forming the handwriting area of the virtual paintbrush based on the line comprises:

obtaining a first segment based on the line, wherein the first segment comprises at least one sub-segment and endpoints of the sub-segment are points among the plurality of points;

making, for each of the sub-segments, a vertical segment crossing an endpoint of the sub-segment, to obtain a plurality of vertical segments;

classifying endpoints of the plurality of vertical segments into two categories based on positions of the endpoints, and connecting, for each category of endpoints, endpoints belonging to the category, to form a second segment and a third segment; and forming the handwriting area of the virtual paintbrush by a sub-segment corresponding to a first point, a sub-segment corresponding to a last point, the second segment and the third segment.

5. The method according to claim 1, further comprising:
connecting the plurality of points along a positive direction or a negative direction of a reference axis in the three-dimensional coordinate system of the real shooting scene to a form a line.

6. The method according to claim 1, wherein the forming handwriting of the virtual paintbrush based on the handwriting area comprises:

filling the handwriting area with a color or a material to form the handwriting of the virtual paintbrush.

7. The method according to claim 1, further comprising:
detecting a movement of the terminal device, wherein the movement serves as the operation performed on the terminal device; or detecting a gesture performed on the screen of the terminal device, wherein the gesture serves as the operation performed on the terminal device.

8. An electronic device, comprising:
one or more processors; and
a memory configured to store one or more programs;
wherein when the one or more programs are executed by the one or more processors, the one or more processors are caused to perform operations of:

acquiring a real shooting scene by a camera of a terminal device;

forming, based on an operation performed on the terminal device, a handwriting area of the virtual paintbrush in the real shooting scene;

forming handwriting of the virtual paintbrush based on the handwriting area, wherein the handwriting is fused with the real shooting scene and a fused image is displayed on the terminal device;

wherein the operations further comprise:
detecting a moving direction and a tilt angle of the terminal device;

determining a direction of a plane formed by the handwriting of the virtual paintbrush based on the moving direction and the tilt angle;

controlling the plane formed by the handwriting of the virtual paintbrush to face a screen in the determined direction;

wherein the operations further comprise:
detecting an initial position of the terminal device in the real shooting scene;

establishing a three-dimensional coordinate system of the real shooting scene based on the initial position of the terminal device, wherein the initial position of the terminal device is an origin of the three-dimensional coordinate;

detecting a plurality of positions of the terminal device when the terminal device moves;

determining a plurality of points of the virtual paintbrush based on the plurality of positions of the terminal device;

creating the handwriting area based on the plurality of points of the virtual paintbrush and predetermined rules;

adding extension areas at two ends of the handwriting area, wherein each of the extension areas has a predetermined shape, and wherein the extension areas serve as a start point and an end point of the virtual paintbrush, respectively; and creating the handwriting of the virtual paintbrush based on the handwriting area and the extension areas.

9. The electronic device according to claim 8, wherein the operations further comprise:

connecting sequentially the plurality of points along a positive direction or a negative direction of a reference axis in the three-dimensional coordinate system of the real shooting scene to form a line.

10. The electronic device according to claim 8, wherein the forming, based on an operation performed on the terminal device, a handwriting area of the virtual paintbrush in the real shooting scene comprises:

determining, based on the operation performed on the terminal device, at least one point formed by the virtual paintbrush in the real shooting scene; and forming the handwriting area of the virtual paintbrush based on the at least one point.

11. The electronic device according to claim 10, wherein the forming the handwriting area of the virtual paintbrush based on the at least one point comprises:

connecting, in a case that a plurality of points are formed, the plurality of points in the real shooting scene according to a predetermined rule to form a line; and forming the handwriting area of the virtual paintbrush based on the line.

12. The electronic device according to claim 11, wherein the forming the handwriting area of the virtual paintbrush based on the line comprises:

obtaining a first segment based on the line, wherein the first segment comprises at least one sub-segment and endpoints of the sub-segment are points among the plurality of points;

making, for each of the sub-segments, a vertical segment crossing an endpoint of the sub-segment, to obtain a plurality of vertical segments;

classifying endpoints of the plurality vertical segments into two categories based on positions of the endpoints, and connecting, for each category of endpoints, endpoints belonging to the category, to form a second segment and a third segment; and forming the handwriting area of the virtual paintbrush by a sub-segment corresponding to a first point, a sub-segment corresponding to a last point, the second segment and the third segment.

13. The electronic device according to claim 8, wherein the forming handwriting of the virtual paintbrush based on the handwriting area comprises:

filling the handwriting area with a color or a material to form the handwriting of the virtual paintbrush.

14. A non-transitory computer readable storage medium storing non-transitory computer readable instructions, wherein the instructions, when being executed by a computer, cause the computer to perform operations comprising:

acquiring a real shooting scene by a camera of a terminal device;

forming, based on an operation performed on the terminal device, a handwriting area of the virtual paintbrush in the real shooting scene;

forming handwriting of the virtual paintbrush based on the handwriting area, wherein the handwriting is fused with the real shooting scene and a fused image is displayed on the terminal device;

detecting a moving direction and a tilt angle of the terminal device;

determining a direction of a plane formed by the handwriting of the virtual paintbrush based on the moving direction and the tilt angle;

controlling the plane formed by the handwriting of the virtual paintbrush to face a screen in the determined direction wherein the operations further comprise:

detecting an initial position of the terminal device in the real shooting scene;

establishing a three-dimensional coordinate system of the real shooting scene based on the initial position of the terminal device, wherein the initial position of the terminal device is an origin of the three-dimensional coordinate;

detecting a plurality of positions of the terminal device when the terminal device moves;

determining a plurality of points of the virtual paintbrush based on the plurality of positions of the terminal device;

creating the handwriting area based on the plurality of points of the virtual paintbrush and predetermined rules;

adding extension areas at two ends of the handwriting area, wherein each of the extension areas has a predetermined shape, and wherein the extension areas serve as a start point and an end point of the virtual paintbrush, respectively; and creating the handwriting of the virtual paintbrush based on the handwriting area and the extension areas.

* * * * *